(12) United States Patent
Bhaskaran et al.

(10) Patent No.: US 7,890,309 B2
(45) Date of Patent: Feb. 15, 2011

(54) SYSTEM AND METHOD FOR ANALYZING A BUSINESS PROCESS INTEGRATION AND MANAGEMENT (BPIM) SOLUTION

(75) Inventors: Kumar Bhaskaran, Englewood Cliffs, NJ (US); Ying Huang, Yorktown Heights, NY (US); Santhosh Kumaran, Croton on Hudson, NY (US); Prabir Nandi, Bayside, NY (US); Zhong Tian, Beijing (CN); Jian Wang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 10/682,801

(22) Filed: Oct. 10, 2003

(65) Prior Publication Data

US 2005/0080609 A1    Apr. 14, 2005

(51) Int. Cl.
*G06G 7/48* (2006.01)
(52) U.S. Cl. ............................................ 703/6; 703/22
(58) Field of Classification Search .................. 703/6, 703/22; 705/8; 709/223; 717/108
See application file for complete search history.

(56) References Cited

U.S. PATENT DOCUMENTS

| | | | |
|---|---|---|---|
| 5,006,998 A | 4/1991 | Yasunobu et al. | |
| 6,202,070 B1 * | 3/2001 | Nguyen et al. | 707/104.1 |
| 6,249,769 B1 | 6/2001 | Ruffin et al. | |
| 6,336,138 B1 * | 1/2002 | Caswell et al. | 709/223 |
| 6,427,230 B1 * | 7/2002 | Goiffon et al. | 717/108 |
| 6,631,354 B1 * | 10/2003 | Leymann et al. | 705/8 |
| 6,718,535 B1 | 4/2004 | Underwood | |
| 7,213,232 B1 | 5/2007 | Knowles | |
| 2002/0147606 A1 | 10/2002 | Hoffmann et al. | |
| 2003/0233367 A1 | 12/2003 | Uluakar et al. | |
| 2004/0034857 A1 * | 2/2004 | Mangino et al. | 718/104 |

OTHER PUBLICATIONS

United States Office Action dated Jul. 16, 2009 in U.S. Appl. No. 10/682,800.
United States Office Action dated Nov. 27, 2009 in U.S. Appl. No. 10/682,800.

* cited by examiner

*Primary Examiner*—Kamini S Shah
*Assistant Examiner*—Herng-Der Day
(74) *Attorney, Agent, or Firm*—Stephen C. Kaufman, Esq.; McGinn IP Law Group, PLLC

(57) ABSTRACT

A system for analyzing a business process integration and management (BPIM) solution includes an assembler which assembles a plurality of solution artifacts to form a platform independent solution template, a simulator which simulates an execution of a BPIM solution based on the platform independent solution template, and an analyzer for analyzing a performance of the BPIM solution.

21 Claims, 9 Drawing Sheets

SYSTEM AND METHOD FOR ANALYZING A BUSINESS PROCESS INTEGRATION AND MANAGEMENT (BPIM) SOLUTION

CROSS REFERENCE TO RELATED APPLICATIONS

This application is related to U.S. patent application Ser. No. 10/682,800 entitled "System and Method for Generating a Business Process Integration and Management (BPIM) Solution" which is commonly assigned with the present application, and is incorporated herein by reference.

BACKGROUND OF THE INVENTION

1. Field of the Invention

The present invention relates to a system and method of analyzing a business process integration and management (BPIM) solution and, in particular, a system and method which analyzes a performance of a BPIM solution.

2. Description of the Related Art

With the advancement of information technology and business transformation, and to increase profits from its value chain, an enterprise has to be able to rapidly modify and adapt its business process and collaboration infrastructure. Business process integration and management (BPIM) is the key to building and managing an adaptive e-business solution infrastructure.

As an enabling technology of business process integration, Web (e.g., Internet) services provide a standardized means to allow heterogeneous applications to communicate with one another. However, existing e-business integration solutions are mostly custom-made by ground-up code development with many undesirable characteristics.

For example, such conventional methods are very labor intensive and very skill demanding. Further, such methods involve unstructured solution knowledge and are, therefore, shareable only at code level. In addition, the process is manually processed from business process model (BPM) to solution creation, and is not adaptable to updates and changes.

Further, business process integration and management (BPIM) is presently the hottest information technology (IT) services area. IT services customers are demanding cost effective solution development and deployment.

However, conventional systems take a long time to get a BPIM solution to market and have a poor development and deployment efficiency. In addition, such conventional systems do not provide a total development environment for the development of BPIM solutions. Thus, such conventional systems do not provide many features that are helpful to a user.

For example, some conventional systems (e.g., advocated by the Object Management Group (OMG)) include a Model Driven Architecture which employs a platform independent model (e.g., business execution model) and platform specific model (e.g., an implementation model), but does not employ applicable, more complex BPIM solutions.

Other conventional systems (e.g., Holosofx Business Process Management (BPM) Workbench) may include simulation and performance analysis, but such analyses are application only to business process level. Thus, this system is not suitable for execution level analysis.

Still other conventional systems (e.g., SAP Business Suite) may include a platform for implementation and monitoring of business processes. However, such systems lack modeling, simulation and performance analysis capabilities.

SUMMARY OF THE INVENTION

In view of the foregoing and other problems, disadvantages, and drawbacks of the aforementioned systems and methods, it is a purpose of the present invention to provide a system and method for analyzing a business process integration and management (BPIM) solution which is significantly more effective and efficient than conventional systems and methods.

An exemplary aspect of the present invention includes a system for analyzing a business process integration and management (BPIM) solution. The system includes an assembler which assembles a plurality of solution artifacts to form a platform independent solution template (e.g., a reusable template), a simulator which simulates an execution of a BPIM solution based on the platform independent solution template, and an analyzer for analyzing a performance of the BPIM solution.

The system may also include, for example, one or more processors, an input device, a memory device and/or a display device (e.g., graphical user interface (GUI)). The system may also include a computer network (e.g., LAN, WAN, Internet) for deploying the BPIM solution. Further, the assembler, simulator and analyzer may be separately formed and separately located, or may be integrally formed and comprise a common processor.

For example, the simulator may simulate a quality of the BPIM solution using a component compatibility check, a quality of the BPIM solution using potential conflict discovery and resolution, and/or a quality of the BPIM solution using business metrics results. Further, the platform independent solution template may include a composition model which is formed of a plurality of solution artifacts.

Further, the analyzer may analyze a performance of the BPIM solution during a generation of the BPIM solution. In addition, the analyzer may analyze a performance of individual BPIM solution components, a performance of the BPIM solution, and/or a performance bottleneck of the BPIM solution.

In addition, the system may include a consistency model which detects an inconsistency between component interfaces, underlying models and applicable policies for the BPIM solution (e.g., a consistent BPIM solution). Further, the consistency model may provide a suggested resolution for any inconsistency discovered.

In addition, a result from the consistency model may be fed back to the platform-independent solution template to generate a consistent BPIM solution, a result from the simulator may be fed back to the platform independent solution template to generate a pre-tested BPIM solution, and a result from the analyzer may be fed back to the platform independent solution template to generate an analyzed BPIM solution. Further, the consistency model, the simulator, and the analyzer may operate based on a common data model within a BPIM solution development environment.

Specifically, the simulator may pre-test a BPIM solution in a simulated environment. In addition, a simulation of the simulator and a performance analysis of the analyzer may be platform-specific.

Further, the solution artifacts may be input from a BPIM solution generator, and may include, for example, a business object solution artifact, adaptive business object solution artifact, application microflow solution artifact, adapter solution artifact, process flow solution artifact, screenflow solution artifact, etc. Further, the plurality of solution artifacts (e.g., an individual solution artifact) may include a service description and interface descriptions. In addition, the plurality of solution artifacts may include standard-based interfaces.

In addition, the platform independent solution template may include links between the solution artifacts, the links comprising at least one of directLink and eventLink. Further, the platform independent solution template may include a common service definition, such as security or solution management. In addition, the platform independent solution template may include a small/medium size business solution template, an insurance industry solution template, a life sciences industry solution template, a telecommunication industry solution template, a personal computer manufacturing industry solution template, etc.

The simulator may generate a simulation for a solution artifact based on a model of the solution artifact. In addition, the simulator may generate a simulation for solution execution based on a common service policy. Further, the platform independent solution template may include at least one of an extensible mark-up language (XML) schema, and a unified modeling language (UML) profile. Further, the simulator and analyzer may implement the platform independent solution template using an extensible mark-up language (XML) schema.

Another aspect of the present invention includes a method of analyzing a business process integration and management (BPIM) solution. The method includes assembling a plurality of solution artifacts to form a platform independent solution template, simulating an execution of a BPIM solution based on the platform independent solution template, and analyzing a performance of the BPIM solution.

The present invention also includes a programmable storage medium tangibly embodying a program of machine-readable instructions executable by a digital processing apparatus to perform the inventive method.

The present invention also includes a method for deploying computing infrastructure in which computer-readable code is integrated into a computing system, and combines with the computing system to perform the inventive method.

With its unique and novel features, the present invention provides a system and method of analyzing a business process integration and management (BPIM) solution which is significantly more effective and efficient than conventional systems and methods.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF THE EMBODIMENTS OF THE INVENTION

Figure 1:
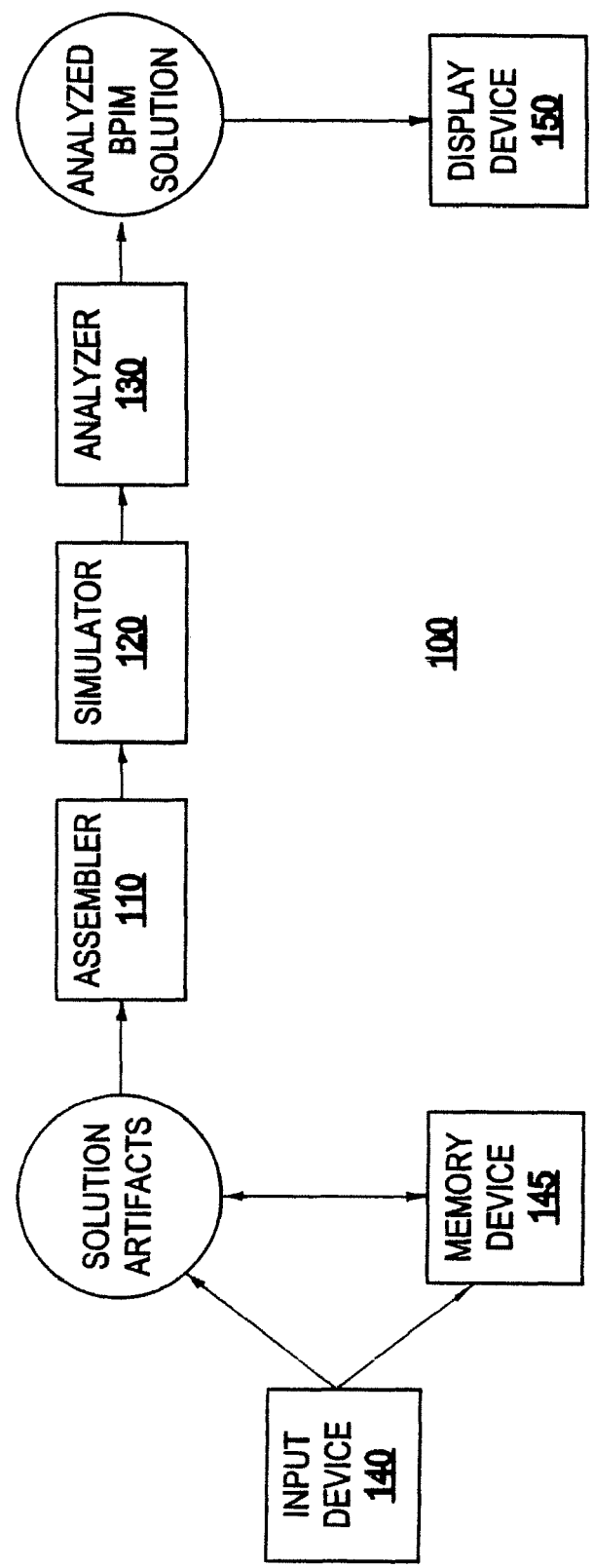
FIG. 1 illustrates inventive system 100 for analyzing a business process integration and management (BPIM) solution, in accordance with an exemplary aspect of the present invention.

Referring now to the drawings, FIG. 1 illustrates an exemplary aspect of the present invention. Specifically, FIG. 1 illustrates an inventive system 100 for business execution modeling, simulation and performance analysis in accordance with an exemplary aspect of the present invention.

As shown in FIG. 1, the inventive system 100 for analyzing a business process integration and management (BPIM) solution includes an assembler 110 which assembles a plurality of solution artifacts to form a platform independent solution template, a simulator 120 which simulates an execution of a BPIM solution based on the platform independent solution template, and an analyzer 130 for analyzing a performance of the BPIM solution.

The system 100 may also include an input device 140 which may input, for example, a business process model, solution artifacts, etc., and a memory device 145 (e.g., random access memory (RAM), read only memory (ROM), etc.) which may be use to store, for example, software for performing a method of the present invention, and to store solution artifacts. That is the memory device 145 may include a database which includes an asset library. For example, the input device 140 may be operatively coupled to a unit in the system (e.g., the memory device 145, assembler 110, etc.), for inputting data and/or instructions to the system.

The system may also include a display device 150 which may display, for example, a generated BPIM solution. For example, the input device 140 and display device 150 may be included as part of a graphical user interface (GUI) for implementing the inventive system 100.

Further, many of the elements of the system 100 (e.g., assembler 110, simulator 120, and analyzer 130) may be formed as one unit (e.g., a processor in a computer system) which may perform the functions of the respective elements. Alternatively, the elements may be separately and/or remotely formed and include a plurality of units (e.g., processors) which may be connected, as shown in FIG. 1.

Specifically, the present invention includes a methodology and tool set for business execution modeling, simulation and performance analysis. For example, the present invention may define a business process integration and management (BPIM) solution through a composition modeling approach. This may be accomplished in a manner described in the above-referenced U.S. patent application Ser. No. 10/682,800 entitled "System and Method for Generating a Business Process Integration and Management (BPIM) Solution". Further, the present invention may also include in the development environment, a capability to simulate the quality of the BPIM solution in terms of component compatibility check, potential conflict discovery and resolution, and business metrics results.

In particular, the present invention may analyze the performance of the BPIM solution in development. For example, such analysis may be used to provide an understanding of the performance of individual solution components, the performance of the overall composed solution, and/or the performance bottleneck of the overall solution.

In addition, the present invention may include a set of tools and development environment that enables the creation of high quality BPIM solutions. For example, the invention may include a composition of solution components, solution simulation, and solution performance analysis.

Moreover, the invention may facilitate the creation of consistent BPIM solutions. Specifically, the invention allows for the automatic discovery of inconsistency in component interfaces, underlying models and applicable policies. In addition, the invention may provide (e.g., automatically provide) suggested resolutions for any inconsistency discovered.

The invention may also include a pre-test for a BPIM solution in a virtual environment. For example, a BPIM solution can be tested in a simulated environment without committing it to the actual testing, and errors can be consequently removed. Thus, the invention is able to provide an understanding of business metrics resulting from the BPIM solution without costly actual business experiments.

Further, the invention may include a fully analyzed solution performance. The performance analysis results provided by the invention may help the actual deployment.

In addition, the invention is end-to-end model driven. Specifically, the solution composition model may be platform-independent, whereas the simulation and performance analysis may be platform specific.

Figure 2A:
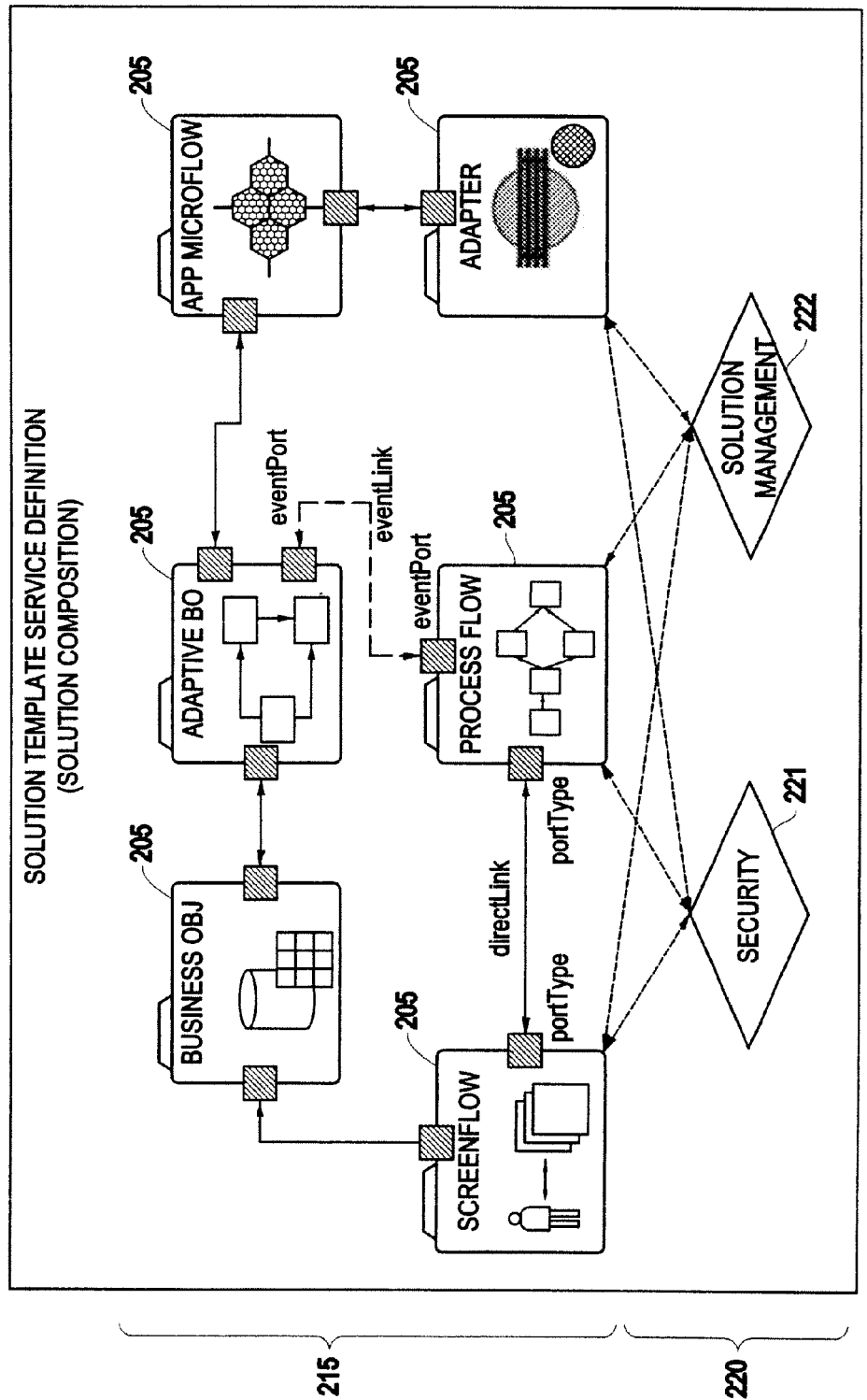
FIG. 2A illustrates a platform-independent solution template service definition (e.g., solution composition) 200, in accordance with an exemplary aspect of the present invention.

For example, FIG. 2A illustrates a platform-independent solution template service definition (e.g., solution composition) 200 according to an exemplary aspect of the present invention. As shown in FIG. 2A, the service definition 200 may include a set 215 of solution artifacts 205. For example, in this exemplary aspect, the solution composition 200 includes three artifacts 205 (e.g., a business object, adaptive business object, application microflow, adapter, process flow and screenflow).

Further, the composition mechanism may include links between and within the artifacts to capture the interdependency among the solution artifacts. Specifically, the invention may use directLink (e.g., regular functional calls) and eventLink (e.g., event subscription and publication relationships). Further, the artifacts 205 may include a service description (e.g., preamble) and interface descriptions 207. In addition, the contents of the solution artifacts 205 may change to match the solution requirements and reusability of existing assets. For example, a solution requirement may be matched with a solution asset.

In addition, the present invention may include common service definitions 220. For example, the invention may support a full description of a BPIM solution including both the content model and common services, such as security (e.g., access control), and solution management (e.g., logging, exception handling, etc.).

The present invention may further permit a common service probe to be placed at any level of the solution composition level and support a hierarchical inheritance model. For example, as shown in FIG. 2A, common services 220 (e.g., security 221 and solution management 222) are supported in a model including the categories (e.g., solution artifacts) of screenflow, process flow and adapter.

Figure 2B:
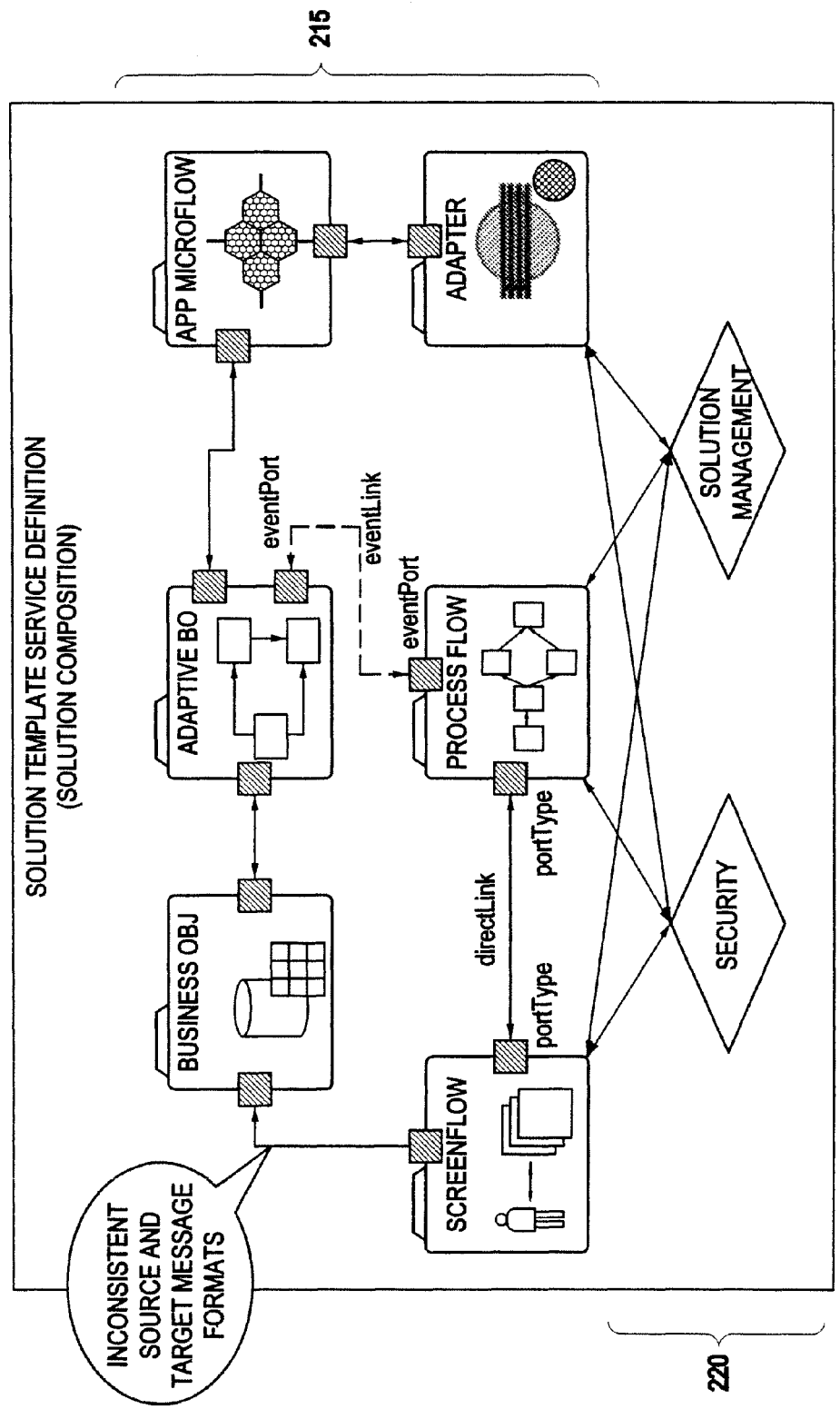
FIG. 2B illustrates the case where there are inconsistent source and target message formats between the business object solution artifact 205, and the screenflow solution artifact 205, in accordance with an exemplary aspect of the present invention.

As illustrated in FIG. 2B, the present invention may further provide for consistency check and resolution. For example, FIG. 2B illustrates the case where there are inconsistent source and target message formats between the business object solution artifact 205, and the screenflow solution artifact 205.

Figure 2C:
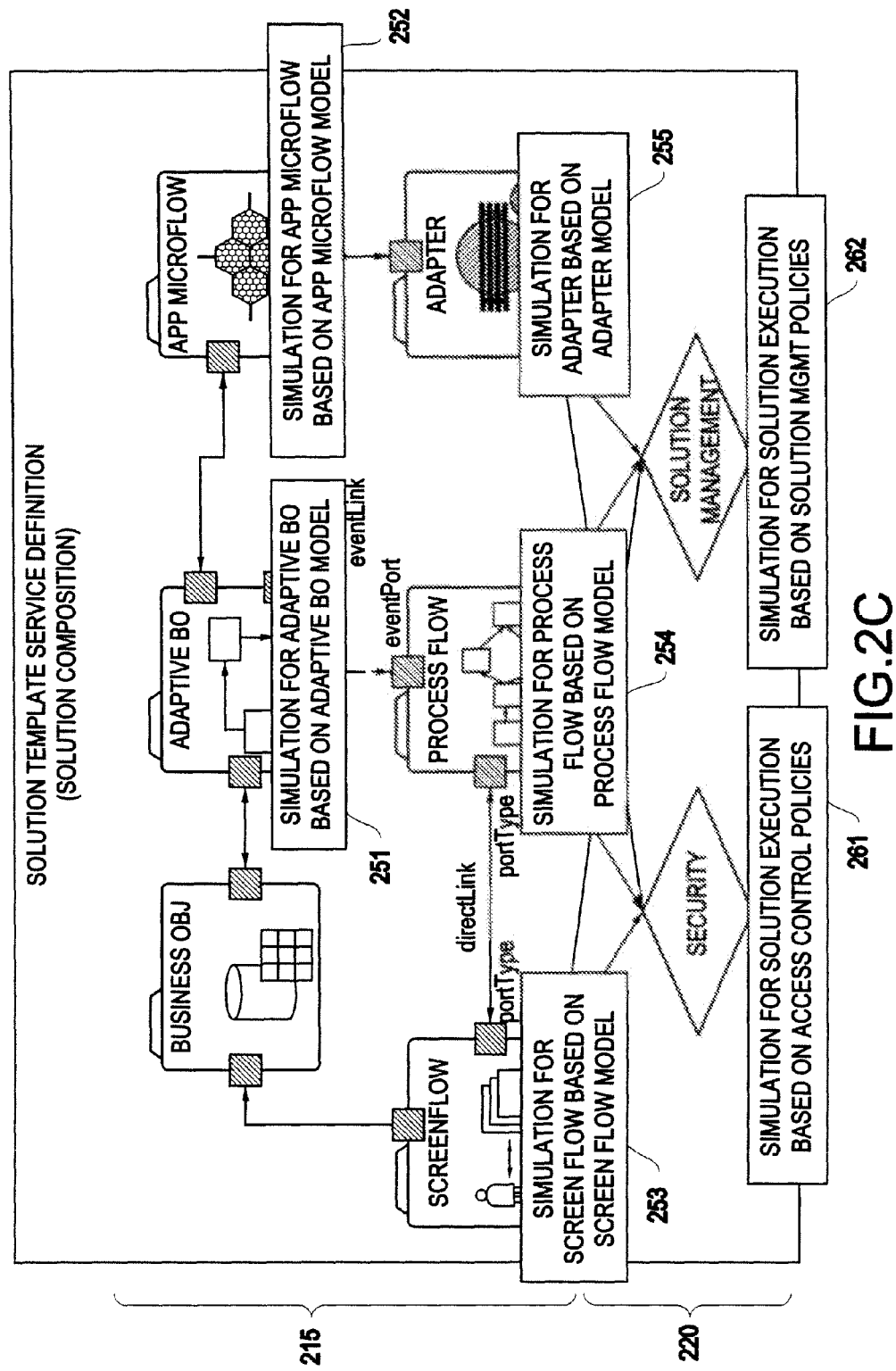
FIG. 2C illustrates simulations of solution artifacts, and simulations for solution execution based on common services, in accordance with an exemplary aspect of the present invention.

As illustrated in FIG. 2C, the present invention may further provide for execution simulation. For example, as illustrated in FIG. 2C, the present invention may provide a simulation 251 for an adaptive business object based on an adaptive business object model, a simulation 252 for an application microflow based on an application microflow model, a simulation 253 for a screenflow based on a screenflow model, a simulation 254 for a process flow based on a process flow model, a simulation 255 for an adapter based on an adapter model. In addition, the invention may provide a simulation 261 for solution execution based on access control (e.g., security) policies, and a simulation 262 for solution execution based on solution management policies.

Figure 2D:
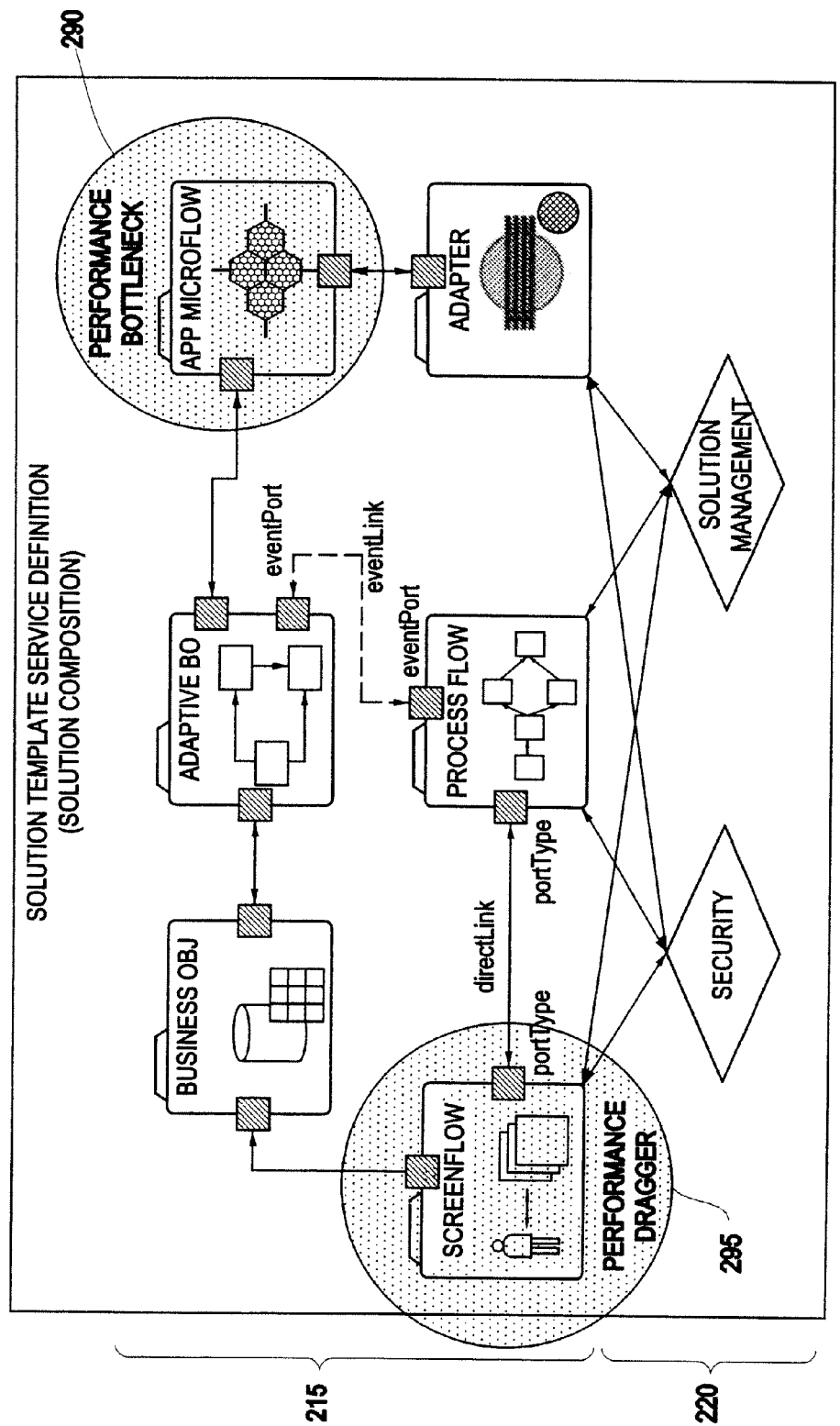
FIG. 2D illustrates the case where a performance bottleneck 290 is located between the adaptive business object solution artifact and the adapter solution artifact, at the application microflow solution artifact, and a performance dragger 295 is located between the process flow solution artifact and the business object solution artifact, at the screenflow solution artifact.

As illustrated in FIG. 2D, the present invention may further provide for performance analysis. For example, FIG. 2D illustrates the case where a performance bottleneck 290 is located between the adaptive business object solution artifact and the adapter solution artifact, at the application microflow solution artifact. In addition, a performance dragger 295 is located between the process flow solution artifact and the business object solution artifact, at the screenflow solution artifact.

Figure 3:
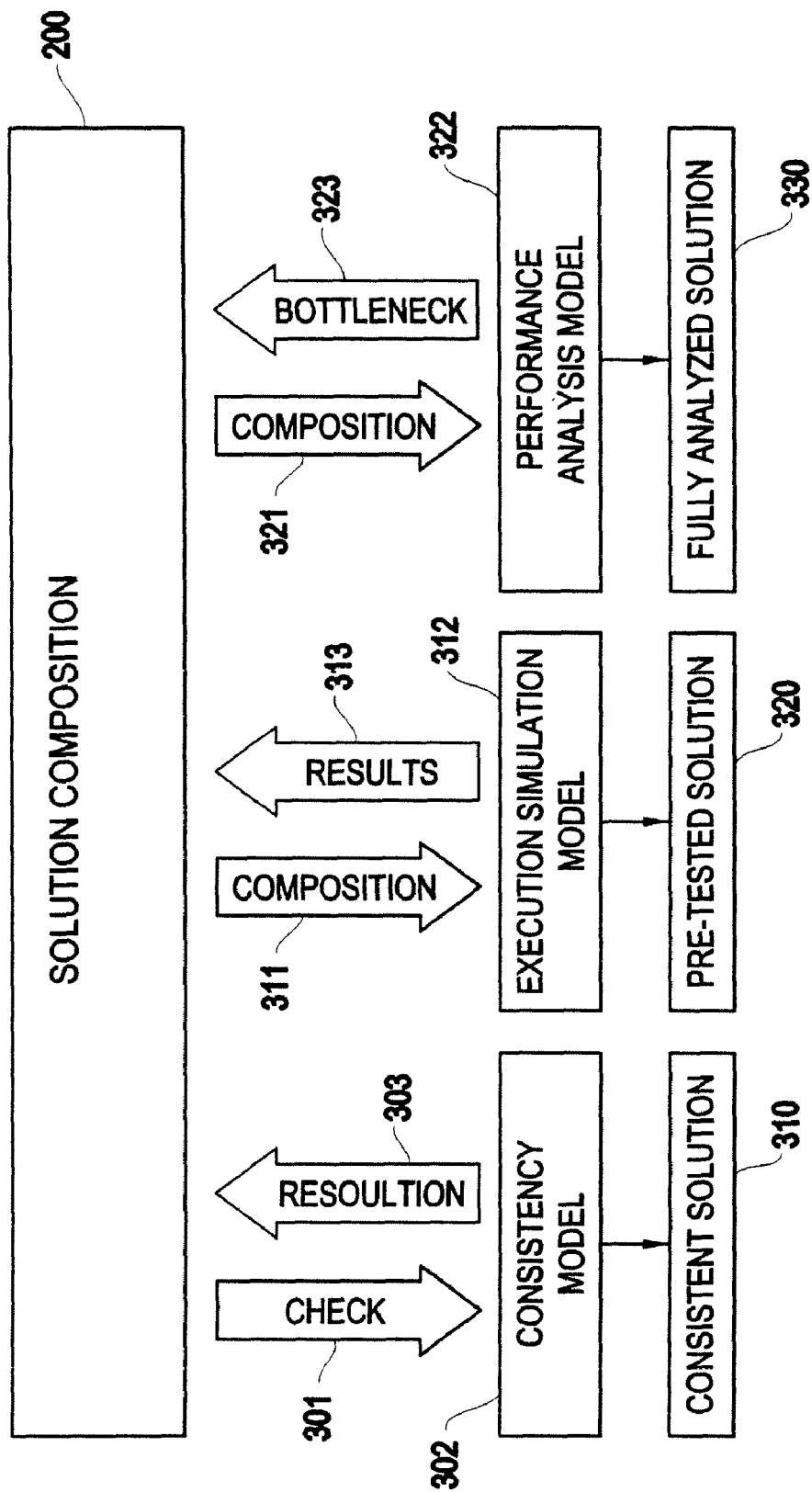
FIG. 3 illustrates a consistent solution 310 a pre-tested solution 320, and an analyzed (e.g., a fully analyzed) solution 330, in accordance with the exemplary aspects of the present invention.

In addition, the system 100 may provide a business execution modeling environment. For example, as illustrated in FIG. 3, the system 100 may generate a consistent solution 310 by performing a check 301 of the solution template service definition (e.g., solution composition) 300 with a consistency model 302, and feeding back a resolution (e.g., inconsistency resolution) 303 to the solution composition 300. The system 100 may further generate a pre-tested solution 320 by applying a composition 311 with an execution simulation model 312, and feeding back the results 313 to the solution composition 200. Thus, the system 100 may generate a fully analyzed solution 330 by applying a composition 321 with a performance analysis model 322 and feeding back any bottlenecks 323 to the solution composition 200.

Figure 4:
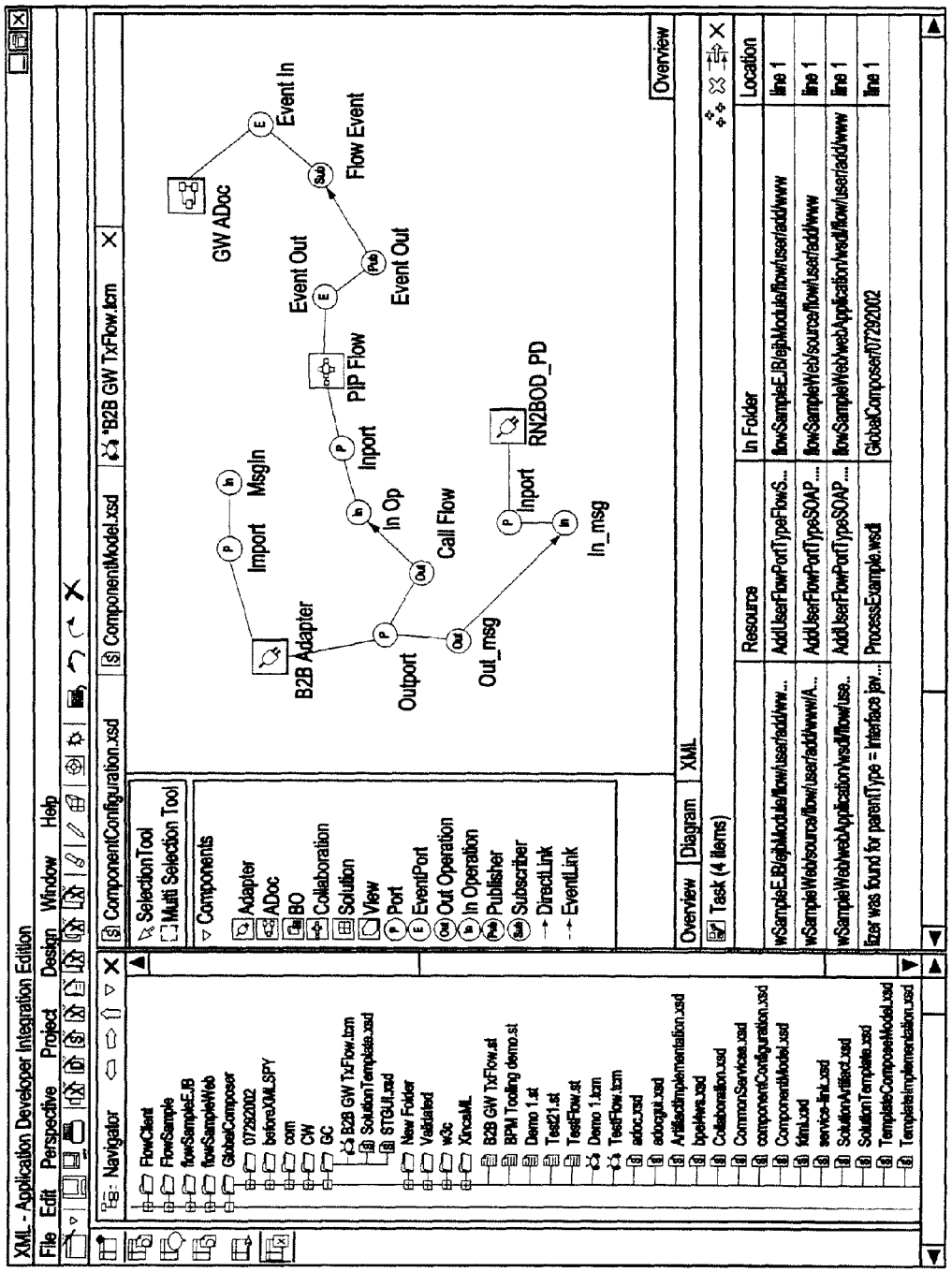
FIG. 4 illustrates a display screen 400 for a graphical user interface (GUI), in accordance with the exemplary aspects of the present invention.

Further, as illustrated in FIG. 4, the system 100 may include a graphical user interface (GUI) (e.g., display device), for displaying the display screen 400. As illustrated in FIG. 4, the present invention may be included as part of a total BPIM solution development environment. Specifically, in the present invention, a BPIM solution template may be implemented using an XML Schema (e.g., a specified XML schema for the solution template framework). The tooling (e.g., software) for the present invention may include, for example, a WSADIE/Eclipse Plugin-Solution Composer (e.g., Version 1.0), as illustrated, for example, in FIG. 4.

Moreover, the same tooling may be used for analyzing the BPIM solution as described above.

The present invention solves many of the problems present in conventional systems. For example, conventional systems developed BPIM solutions at a component level with integration being done in an ad hoc fashion without model-based pre-testing and analysis. Further, such systems could not provide for pre-testing and, therefore, encountered challenging integration testing. That is, without pre-testing, integration testing of all separately developed components becomes a very challenging task.

In addition, such conventional systems encountered difficulty in handling of non-functional requirements. Performance analysis is generally an after-thought when performance-related problems cause major user complaints or operational disruption. The performance analysis in the present invention (e.g., a total BPIM solution development environment) should improve recognition of performance dragging factors and bottlenecks.

The composition model and the associated tools in this invention will help reduce the time required to get a BPIM solution to market, and increase development and deployment efficiency. The invention also provides a total development environment for the development of BPIM solutions. That is, the invention provides consistency check, simulation and performance analysis, which are all based on a common data model within the development environment.

In addition, the present invention may have many applications. For example, the invention may be used to improve delivery of global services. Specifically, the models and the total BPIM solution development environment may be used to improve the ability to develop and deliver BPIM solutions to clients on a global scale.

Further, the models and the total BPIM solution development environment may be used to better integrate and manage a company's own business processes (e.g., via more effective BPIM solution development).

Figure 5:
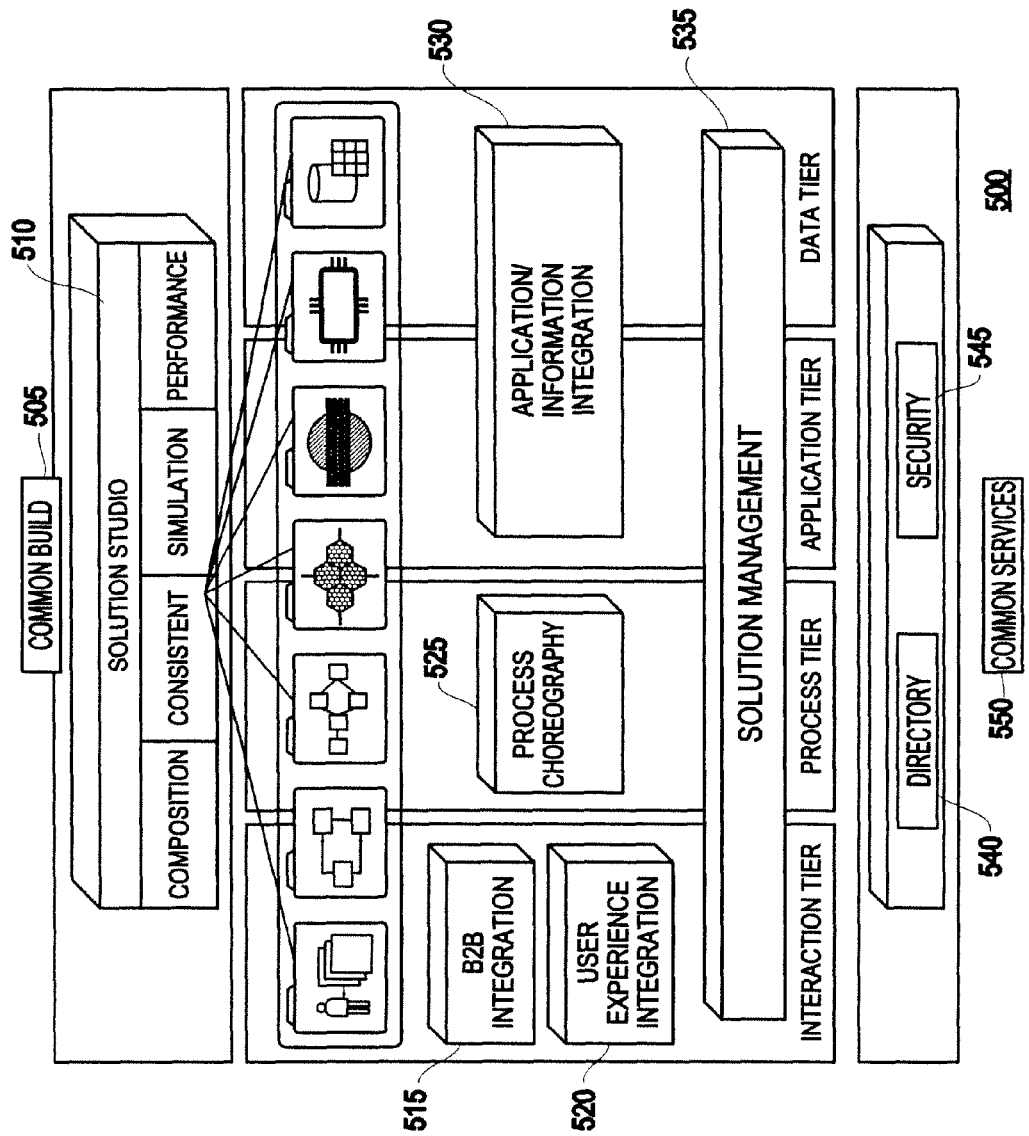
FIG. 5 illustrates an example of a BPIM software solution stack 500 which may be utilized in accordance with an exemplary aspect of the present invention.

For example, FIG. 5 illustrates a example of a BPIM software solution stack 500 which may be utilized in an exemplary aspect of the present invention. Specifically, the solution stack 500 includes a common build 505 and solution studio 510. Further, the solution stack 500 includes an interaction tier, process tier, application tier and data tier. For example, the interaction tier may include B2B integration 515 and user experience integration 520, the process tier may include process choreography 525, and application and data tiers may include application/information integration 530. Further, solution management 535 may be included in all four tiers. Further, the solution stack 500 includes a directory 540, security 545 and common services 550. Further, the solution template may include, for example, a small/medium size business (e.g., global small/medium size business) solution template, an insurance industry solution template (e.g., proof of concept), a life sciences industry solution template (e.g., drug discovery process), a telecommunication industry solution template, and/or a personal computer manufacturing industry solution template.

Figure 6:
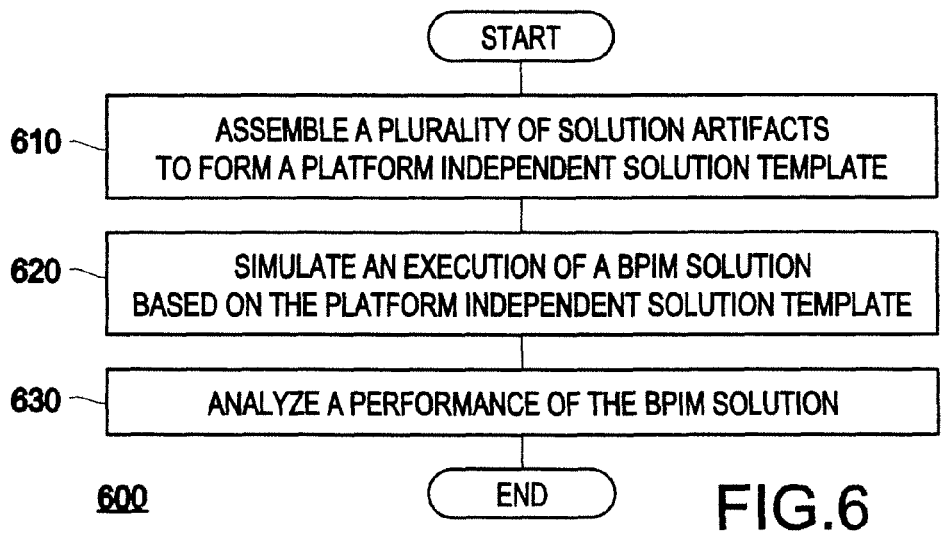
FIG. 6 illustrates an inventive method 600 for analyzing a business process integration and management (BPIM) solution, in accordance with an exemplary aspect of the present invention.

Referring again to the drawings, FIG. 6 illustrates a method 600 of analyzing a business process integration and management (BPIM) solution. As illustrated in FIG. 6, the method 600 may include assembling (610) a plurality of solution artifacts to form a platform independent solution template, simulating (620) an execution of a BPIM solution based on the platform independent solution template, and analyzing (630) a performance of the BPIM solution.

Further, the inventive method 600 may include the features and functions described above with respect to the system 100.

For example, the inventive method may provide in a development environment, a capability to simulate the quality of the BPIM solution in terms of component compatibility check, potential conflict discovery and resolution, and business metrics results.

Figure 7:
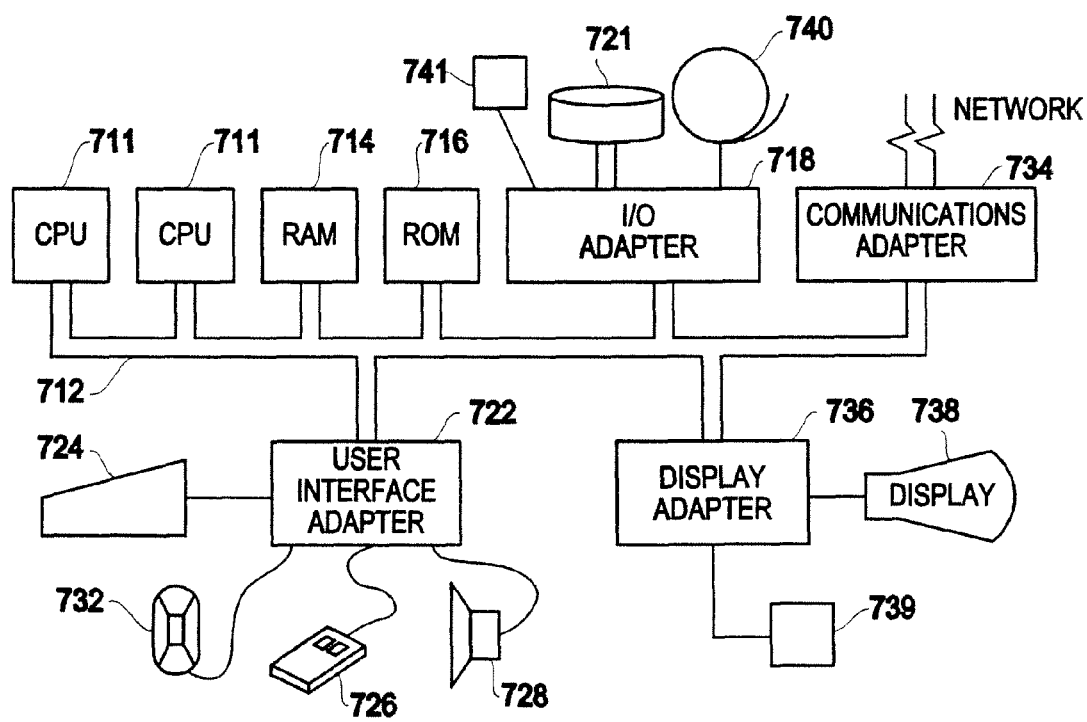
FIG. 7 illustrates an example of hardware that may be used for generating a business process integration and management (BPIM) solution, in accordance with an exemplary aspect of the present invention.

Referring now to FIG. 7, system 700 illustrates a typical hardware configuration which may be used for implementing the inventive system and method for analyzing a BPIM solution. The configuration has preferably at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 711 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

Figure 8:
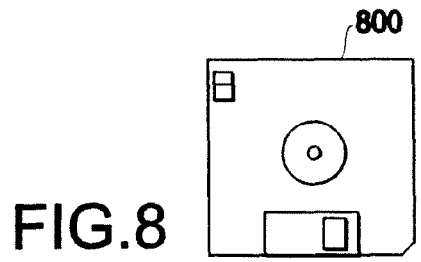
FIG. 8 illustrates a programmable storage medium which may tangibly embody a program of machine-readable instructions executable by a digital processing apparatus to perform the inventive method.

This signal-bearing media may include, for example, a RAM contained within the CPU 711, as represented by the fast-access storage for example. Alternatively, the instructions may be contained in another signal-bearing media, such as a magnetic data storage diskette 800 (e.g., as illustrated in FIG. 8), directly or indirectly accessible by the CPU 711.

Whether contained in the computer server/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may include software object code, compiled from a language such as C+, C++, etc.

With its unique and novel features, the present invention provides a system and method of analyzing a business process integration and management (BPIM) solution which is significantly more effective and efficient than conventional systems and methods.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A system for analyzing a business process integration and management (BPIM) solution, comprising:
    a BPIM solution generator which generates a plurality of solution artifacts;
    a BPIM solution developer which develops a BPIM solution from a platform independent solution template, the BPIM solution developer comprising:
        an assembler which assembles the plurality of solution artifacts to form the platform independent solution template for said BPIM solution, said template comprising a solution composition model including said plurality of solution artifacts and links between said plurality of solution artifacts;
        a simulator which simulates an execution of said BPIM solution based on the platform independent solution template, a result from said simulator being fed back to said solution composition model;
        an analyzer for analyzing a performance of said BPIM solution and, analyzing individual performance of the plurality of solution artifacts, a result from said analyzer being fed back to said solution composition model; and
        a consistency model which:
            detects an inconsistency at an interface between a first solution artifact of the plurality of solution artifacts and a second solution artifact of the plurality of solution artifacts, a result from said consistency model being fed back to said solution composition model; and
            provides a suggested resolution for said inconsistency and outputs said BPIM solution based on the suggested resolution; and
    a display device for displaying said result from said analyzer,
    wherein said consistency model, said simulator, and said analyzer operate based on said solution composition model within a BPIM solution development environment, and
    wherein said inconsistency comprises inconsistent source and target message formats between said first solution artifact of the plurality of solution artifacts and said second solution artifact of the plurality of solution artifacts.

2. The system according to claim 1, wherein said simulator simulates a quality of said BPIM solution using a component compatibility check.

3. The system according to claim 1, wherein said simulator simulates a quality of said BPIM solution using potential conflict discovery and resolution.

4. The system according to claim 1, wherein said simulator simulates a quality of said BPIM solution using business metrics results.

5. The system according to claim 1, wherein said assembler, simulator and analyzer comprise a common processor.

6. The system according to claim 1, wherein said analyzer analyzes a performance bottleneck of said BPIM solution.

7. The system according to claim 1, wherein said simulator pre-tests said BPIM solution in a simulated environment.

8. The system according to claim 1, wherein a simulation of said simulator and a performance analysis of said analyzer are platform-specific.

9. The system according to claim 1, wherein said plurality of solution artifacts comprises one of a business object solution artifact, adaptive business object solution artifact, application microflow solution artifact, adapter solution artifact, process flow solution artifact and screenflow solution artifact.

10. The system according to claim 1, wherein said links between said plurality of solution artifacts comprise at least one of directLink and eventLink.

11. The system according to claim 1, wherein said plurality of solution artifacts comprises service description and interface descriptions.

12. The system according to claim 1, wherein said platform independent solution template comprises a common service definition.

13. The system according to claim 1, wherein said simulator generates a simulation for a solution artifact based on a model of said solution artifact.

14. The system according to claim 1, wherein said simulator generates a simulation for solution execution based on a common service policy.

15. The system according to claim 1, wherein said simulator and analyzer implement said platform independent solution template using an extensible mark-up language (XML) schema.

16. The system according to claim 1, further comprising:
    a computer network for deploying said BPIM solution.

17. The system according to claim 16, wherein said computer network comprises one of a local area network (LAN), wide area network (WAN) and the Internet.

18. The system according to claim 1, wherein said platform independent solution template comprises at least one of an extensible mark-up language (XML) schema, and a unified modeling language (UML) profile.

19. A method of analyzing a business process integration and management (BPIM) solution, comprising:
    generating a plurality of solution artifacts;
    developing a BPIM solution from a platform independent solution template, comprising:
        assembling the plurality of solution artifacts to form the platform independent solution template for said BPIM solution, said template comprising a solution composition model including said plurality of solution artifacts and links between said plurality of solution artifacts;
        simulating an execution of said BPIM solution based on the platform independent solution template, and feeding a result from said simulating said execution back to said solution composition model;
        analyzing a performance of said BPIM solution and analyzing individual performance of the plurality of solution artifacts, a result of said analysis being fed back to said solution composition model;

detecting an inconsistency at an interface between a first solution artifact of the plurality of solution artifacts and a second solution artifact of the plurality of solution artifacts, a result from said detecting said inconsistency being fed back to said solution composition model; and providing a suggested resolution for the inconsistency and outputting said BPIM solution based on the suggested resolution; and displaying said result from said analysis on a display device, wherein said detecting of said inconsistency, said simulating of the execution of the BPIM solution, and said analyzing of the performance of the BPIM solution are performed based on said solution composition model within a BPIM solution development environment, and wherein said inconsistency comprises inconsistent source and target message formats between said first solution artifact of the plurality of solution artifacts and said second solution artifact of the plurality of solution artifacts.

20. A programmable storage medium tangibly embodying a program of machine-readable instructions executable by a digital processing apparatus to perform a method for analyzing a business process integration and management (BPIM) solution, said method comprising:

generating a plurality of solution artifacts;

developing a BPIM solution from a platform independent solution template, comprising:

assembling the plurality of solution artifacts to form the platform independent solution template for said BPIM solution, said template comprising a solution composition model including said plurality of solution artifacts and links between said plurality of solution artifacts;

simulating an execution of said BPIM solution based on the platform independent solution template, and feeding a result from said simulating said execution back to said solution composition model;

analyzing a performance of said BPIM solution and analyzing individual performance of the plurality of solution artifacts, a result of said analysis being fed back to said solution composition model;

detecting an inconsistency at an interface between a first solution artifact of the plurality of solution artifacts and a second solution artifact of the plurality of solution artifacts, a result from said detecting said inconsistency being fed back to said solution composition model; and providing a suggested resolution for the inconsistency and outputting said BPIM solution based the suggested resolution; and displaying said result of said analysis on a display device, wherein said detecting of said inconsistency, said simulating of the execution of the BPIM solution, and said analyzing of the performance of the BPIM solution are performed based on said solution composition model within a BPIM solution development environment, and wherein said inconsistency comprises inconsistent source and target message formats between said first solution artifact of the plurality of solution artifacts and said second solution artifact of the plurality of solution artifacts.

21. The system according to claim 1, wherein a result of said analyzing said performance of said BPIM solution is used to generate a next BPIM solution, said simulator simulates an execution of said next BPIM solution and said analyzer analyzes a performance of said next BPIM solution.

* * * * *